United States Patent

[11] 3,627,826

[72] Inventor Charles M. Selwitz
 Monroeville, Pa.
[21] Appl. No. 92,938
[22] Filed Nov. 25, 1970
[45] Patented Dec. 14, 1971
[73] Assignee Gulf Research Development Company
 Pittsburgh, Pa.

[54] PROCESS FOR HALOGENATING CARBOXYLIC ACIDS
 12 Claims, No Drawings
[52] U.S. Cl. ........................................ 260/539 A,
 260/408, 260/539 R
[51] Int. Cl. ........................................ C07c 53/16,
 C07c 53/32
[50] Field of Search ........................... 260/539 R,
 539 A, 408

[56] References Cited
UNITED STATES PATENTS

| | | | |
|---|---|---|---|
| 2,688,634 | 9/1954 | Pinkston | 260/539 A |
| 3,352,907 | 11/1967 | Reichenider et al. | 260/539 R |
| 3,152,174 | 10/1964 | Morris et al. | 260/539 A |
| 3,363,010 | 1/1968 | Schwarzenbec | 260/515 A |

Primary Examiner—Lorraine A. Weinberger
Assistant Examiner—Jacqueline L. Davison
Attorneys—Meyer Neishloss, Deane E. Keith and Donald L. Rose ABSTRACT: A process for chlorinating or brominating a carboxylic acid which involves heating a carboxylic acid with chloride ions or bromide ions and molecular oxygen in the presence of nitrate ions, a carboxylic acid anhydride and a heavy metal cation. Acetic acid is converted to chloroacetic acid.

PROCESS FOR HALOGENATING CARBOXYLIC ACIDS

This invention relates to a process for chlorinating or brominating a carboxylic acid.

I have discovered that chlorination or bromination of a carboxylic acid can be advantageously effected with chloride ions or bromide ions if the reaction is carried out in the presence of nitrate ions, molecular oxygen, a carboxylic acid anhydride and a heavy metal salt. Since chloroacetic acid is the most commercially important halogenated carboxylic acid, this process is of particular value in the chlorination of acetic acid to chloroacetic acid.

The carboxylic acid that can be halogenated hereunder contains from two to about 20 carbon atoms, preferably two to about six carbon atoms. This includes acetic acid, propionic acid, butyric acid, isobutyric acid, valeric acid, isovaleric acid, caproic acid, isocaproic acid, heptanoic acid, caprylic acid, pelargenic acid, capric acid, decanoic acid, undecanoic acid, lauric acid, tridecanoic acid, myristic acid, palmitic acid, stearic acid, arachidic acid. The carboxylic acid can be used in excess in this reaction in order to serve as a solvent for the other components.

There must be present in the reaction system chloride ions or bromide ions to halogenate the carboxylic acid defined above. By "chloride ions or bromide ions" I mean a singly negatively charged chlorine or bromine atom. Although the chloride ion or bromide ion can be obtained from many compounds, desirably such ion is obtained from a compound that is readily capable of dissociating in the present reaction system to chloride or bromide ions, such as hydrogen chloride, hydrogen bromide, ammonium chloride, ammonium bromide, organic chlorides and bromides, such as aniline hydrochloride, methyl amine hydrochloride, benzyl trimethyl ammonium bromide and metallic chlorides and bromides, such as sodium chloride, potassium bromide, rubidium chloride, magnesium bromide, cupric chloride, barium chloride, calcium chloride, aluminum bromide, etc. Of these I prefer to use hydrogen chloride or hydrogen bromide. The amount of chloride or bromide ion present in the system relative to the carboxylic acid on a molar basis can be, for example, from about 2:1 to about 1:20, preferably from about 1:2 to about 1:10; however, in the preferred procedure the carboxylic acid is used in substantial excess to serve as a reaction solvent. For this reason product yield and relative proportions are based upon the halogen present.

In order to obtain the desired conversion herein it is imperative that the above materials be brought into contact with each other in the presence of nitrate ions. Any compound which by ionization, oxidation or disproportionation under the reaction conditions defined herein will result in the production of nitrate ions can be employed. By "nitrate ions" I mean to include $NO_3$, a singly charged anion containing one nitrogen atom and three oxygen atoms. Examples of compounds that can be employed include nitric acid, sodium nitrate, cesium nitrate, etc. Of these I prefer to employ nitric acid. The amount of nitrate ion employed on a molar basis, relative to the halogen charge, can be from about 1:5 to about 1:20, preferably from about 1:2 to about 1:1,000.

Also required in the reaction system is a lower carboxylic acid anhydride derived from carboxylic acids having from two to six carbon atoms, preferably from two to three carbon atoms. Examples of carboxylic acid anhydrides that can be employed include acetic anhydride, propionic anhydride, butyric anhydride, isobutyric anhydride, cyclobutyl carboxylic acid anhydride, hexanoic anhydride and the like. The amount of carboxylic acid anhydride employed can be from about 1:2 to about 1:100 mols, preferably from about 1:3 to about 1:10 mols, per mol of halogen charge.

As defined above, the reaction is carried out in the presence of molecular oxygen. When this is done, less nitrate ion is required and conversion of carboxylic acid is increased. The amount of molecular oxygen that can be employed relative to the halogen, on a molar basis, can be from about 2:1 to about 1:6, preferably from about 1:1 to about 1:3.

Rates of reaction are increased by additionally having present in the reaction system a substance selected from the group consisting of copper, manganese, cerium, cobalt, vanadium, chromium, iron, nickel, cadmium, tin, antimony, mercury, bismuth, the noble metals and compounds of these metals. Examples of compounds that can be employed herein include metallic iron, ferric acetate, ferric propionate, ferric hydroxy acetate, ferric chloride, ferric hydroxide, ferric nitrate, ferric phosphate, ferric sulfate, ferrous acetate, ferrous nitrate, ferrous lactate, ferrous bromide, palladium, rhodium, iridium, osmium, ruthenium, platinum, rhodium formate, palladium acetate, palladium propionate, iridium butyrate, palladium pivalate, palladium octanoate, osmium isooctanoate, palladium benzoate, palladium laurate, ruthenium stearate, palladium isobutyrate, palladium para-toluate, platinum gamma-chlorobutyrate ruthenium tetracontanoate, osmium phenyl-acetate, iridium cyclohexane carboxylate, rhodium crotonate, palladium furoate, palladium heptanoate, palladium eicosanoate, palladium chloride, palladium nitrate, palladium oxide, rhodium bromide, iridium sulfate, osmium cyanide, ruthenium perchlorate, rhodium iodide, platinum fluoride, platinum phosphate, platinum pyrophosphate, ruthenium oxide, platinic bromide, platinous bromide, platinum oxide, platinous cyanide, platinum hydroxide, rhodium sulfate, rhodium oxide, osmium tetroxide, ruthenium trichloride, iridium oxide, metallic copper, cupric nitrate, cuprous chloride, cupric acetate, manganese, manganic oxide, manganese acetate, cerium, cerous nitrate, ceric ammonium sulfate, cobalt, cobaltous bromide, cobaltous fluoride, cobaltous perchlorate, cobaltic chloride, vanadium, vanadium pentoxide, vanadium dichloride, vanadium pentafluoride, vanadyl bromide, chromium, chromium trioxide, chromic acetate, nickel, nickel acetate, nickel nitrate, cadmium, cadmium perchlorate, cadmium manganate, tin, tin tetrachloride, tin trifluoride, tin sulfate, antimony, antimony chloride, antimony butyrate, mercury, mercuric acetate, mercuric nitrate, bismuth, bismuth phosphate, bismuth arsenate, bismuth oxychloride, etc.

A noble metal compound or copper compounds is preferred, and most preferred is a carboxylic acid salt of the metal. Thus, the cationic portion of the salt can be copper or one of the defined noble metals such as palladium, while the anionic portion thereof can be derived from the group of carboxylic acids, straight and branched chain, having from one to 40 carbon atoms, preferably from two to six carbon atoms, examples of which have been identified above. The amount of metal, or compounds thereof, as metal, on a molar basis relative to halogen, employed can range from about 0.0001 percent to about 10 percent, preferably from about 0.1 percent to about 5 percent.

As to reaction conditions, the temperature can be from about 80° to about 150° C., preferably from about 60° to about 120° C., the presence from about 0.5 to about 5,000 pounds per square inch gauge, preferably from about 10 to about 500 pounds per square inch gauge, and the reaction time from about 0.5 to about 50 hours.

At the end of the reaction period the halogenated carboxylic acid produced, which can carry one or more halogens thereon, can be recovered from the reaction mixture in any suitable manner, for example, by distillation. Depending upon their boiling points, the individual components in the reaction mixture, including the desired chloro or bromo carboxylic acid, will come off individually overhead an can thus be easily recovered.

The process of the invention can further be illustrated by the following. A series of reaction mixtures were made up using 119.3 grams of acetic acid, 4.0 grams of 70 percent aqueous nitric acid and the components identified in table I. A series of runs were carried out in which the reaction mixture was placed in a 200-milliliter, thick-walled glass reactor, provided with a magnetic stirrer. In each run the mixture was heated to a predetermined temperature level and oxygen was supplied to the reactor to maintain a pressure of 170 pounds per square inch gauge throughout the reaction period. At the end of each run the reactor was cooled, depressured and the contents removed for analysis. The results obtained are tabulated below in table I. In each run analysis was by gas chromatography.

TABLE I

| Run | 1 | 2 | 3 | 4 | 5 | 6 |
|---|---|---|---|---|---|---|
| Pd(OAc)$_2$, g | 1.12 | | 1.12 | | | 1.12 |
| Cu(OAc)$_2$, g | | 3.63 | | | 3.63 | |
| H$_2$SO$_4$, g | | | 8.9 | | | |
| Acetic anhydride, g | | | | 10 | 10 | 10 |
| HCl, mmols | 310 | 420 | 354 | 285 | 417 | 321 |
| O$_2$ uptake, mmols | 4 | 61 | 72 | 31 | 148 | 120 |
| Temp., °C | 140 | 120 | 120 | 120 | 120 | 120 |
| Time, hours | 2.25 | 3.5 | 4.0 | 3.5 | 6.0 | 5.0 |
| Chloroacetic acid: | | | | | | |
| Grams | | 9.2 | 9.1 | 9.8 | 22.1 | 19.6 |
| Mmols | | 98 | 96 | 104 | 234 | 208 |
| Yield,[1] percent | | 23 | 27 | 37 | 57 | 65 |

[1] Percent yield based on HCl reacted.

a—percent yield based on HCl reacted.

A study of the data in table I clearly illustrates the advantages of operating in accordance with the process defined and claimed herein. In Runs 5 and 6 the advantage of carrying out the halogenation in the presence of both the heavy metal catalyst and the carboxylic acid anhydride instead of either alone is clearly demonstrated. In like manner acetic acid is converted to bromoacetic acid, propionic acid is converted to 2-chloropropionic acid, stearic acid is converted to chlorostearic acid, caproic acid is converted to bromocaproic acid and the like.

It should be understood that the above examples are merely illustrative of the principles of the present invention and that various modifications may be made in the examples given without departing from the spirit and scope of the invention as defined in the following claims.

I claim:
1. A process for preparing a halogenated carboxylic acid selected from the group consisting of chloro carboxylic acids and bromo carboxylic acids which comprises heating a carboxylic acid having at least two carbon atoms and up to about 20 carbon atoms with a halogen ion selected from the group consisting of chloride ions and bromide ions, a nitrate ion, molecular oxygen, a lower carboxylic acid anhydride and a material selected from the group consisting of copper, manganese, cerium, cobalt, vanadium, chromium, iron, nickel, cadmium, tin, antimony, mercury, bismuth, and the noble metals and compounds of these metals.
2. The process of claim 1 wherein said carboxylic acid charge has from two to six carbon atoms.
3. The process of claim 1 wherein said halogen ion is a chloride ion.
4. The process of claim 3 wherein said halogen ion is obtained from hydrogen chloride.
5. The process of claim 1 wherein said lower carboxylic acid anhydride has from four to 12 carbon atoms.
6. The process of claim 5 wherein said lower carboxylic acid anhydride has from four to six carbon atoms.
7. The process of claim 1 wherein said carboxylic acid is acetic acid and the halogenated carboxylic acid is chloroacetic acid.
8. The process of claim 1 wherein said material is a noble metal compound.
9. The process of claim 1 wherein said material is a copper compound.
10. The process of claim 1 wherein said nitrate ion is obtained from nitric acid.
11. The process of claim 1 wherein the reaction temperature is about 80° to about 150° C.
12. The process of claim 1 wherein the reaction temperature is about 60° to about 120° C.

* * * * *